Patented Apr. 2, 1946

2,397,825

UNITED STATES PATENT OFFICE 2,397,825

PRODUCTION OF METHYLOL UREA ETHERS

Herbert J. West, Riverside, Conn., assignor to American Cyanamid Company, New York, N. Y., a corporation of Maine No Drawing. Application July 26, 1941, Serial No. 404,203

4 Claims. (Cl. 260—553)

This invention relates to the production of dialkyl ethers of dimethylol urea and is more particularly concerned with the production of the dimethyl and diethyl ethers.

Many and varying processes have been suggested and used for the production of the ethers of dimethylol urea by the reaction of the latter material with various alcohols. When the higher alcohols are used in this reaction, the process is relatively simple and yields are sufficiently good for commercial purposes. However, in the production of the methyl and ethyl ethers, on a commercial scale, the yields obtained are much lower and, as a result, the large scale production of these ethers has not been found to be practicable.

I have now found that these alkyl ethers of dimethylol urea may be prepared commercially by a simple and economical process with a practically 100% yield of theoretical. Stated generally, the process involves the reaction of the alcohols with dimethylol urea under acid conditions at a pH below 4 and at a temperature below 30° C., the acidity of the reaction mixture being regulated by the use of such acids as can be removed from the solution by precipitation with a base capable of forming a salt with the acid substantially insoluble in the reaction mixture, thus giving a solution free from electrolytes.

The following is one specific method of carrying out my process which is not limited to the details set forth, parts being given by weight.

To 100 parts of crystalline dimethylol urea from any suitable source, are added 200 parts of methyl alcohol. ⅓ part of oxalic acid crystals are added and the mixture is stirred at a temperature below 30° C. until a clear solution having a pH of 2.8 is obtained indicating that reaction is complete. To the reaction mixture is added sufficient barium hydroxide to precipitate barium oxalate and thereby remove the oxalic acid from the solution. A slight excess of barium hydroxide is used to give a pH of 7.5–8.0. The precipitated barium oxalate is removed by filtration and the filtrate is concentrated in vacuo (26–28 inches) by heating to a temperature not exceeding 50° C. The concentration is continued until the solution contains about 60% solids.

If the crystalline dimethyl ether of dimethylol urea is desired, there may be added to the concentrated solution, an equal part of toluol and the distillation continued to remove any remaining water and uncombined methyl alcohol. The methanol and water-free mixture is obtained as a slurry since the ether crystals are insoluble in toluol. The slurry may be filtered and the crystals dried to remove any adhering toluol. Throughout these operations the temperature of the materials is maintained below 50° C. The mass of crystals obtained represents a yield corresponding to 100% theoretical. These crystals have a melting point of 90°–95° C. and, based on analysis of their nitrogen content, are about 102% pure, the excess above theory being due to slight demethylation. This crystalline product may be used for many purposes since it is infinitely soluble in water and has considerable general utility.

If a resinous ether is desired rather than the crystalline ether, as when the ether is to be blended with an alkyd resin, for instance, the process is varied slightly to give the desired type of product. When the ether solution is concentrated in vacuo as above, the heating and concentration is continued until a temperature of about 90° C. is reached. At this time the last traces of water are removed by adding toluol in an amount equal to about 20% of the calculated yield, and distillation is continued until the toluol and water are removed. The resultant product is a clear melt which may then be dumped in trays or the like and allowed to harden. The nitrogen content of this product indicates a degree of purity equivalent to 104% since the product contains about 90% of the dimethyl ether of dimethylol urea and about 10% partially demethylated ether. This subject matter is more particularly claimed in my copending application Serial No. 424,949, filed December 30, 1941.

In place of the methyl alcohol in the above example I may utilize ethyl alcohol to prepare the corresponding diethyl ethers of dimethylol urea. Likewise other primary monohydric alcohols may be substituted, e. g., propyl, butyl, etc. In place of oxalic acid and barium hydroxide there may be used such other combinations of acids and bases as will produce a salt substantially insoluble in the reaction mixture. Acids include phosphoric and sulfuric and bases include calcium or magnesium hydroxide, etc. Benzol or other suitable hydrocarbon may be used in place of the toluol. The ratios of the reacting materials may be varied to some extent without affecting the final products.

These ethers may also be mixed with various cellulose esters and ethers in suitable aqueous or organic solvents. For example, 20 parts of the dimethyl or diethyl dimethylol ether may be mixed with 80 parts of methyl cellulose in aqueous solution and such solution applied to a suitable surface. After drying and heating in the presence of an acid reacting material, it is found that the methyl cellulose is insoluble in water.

The water-soluble crystalline ethers are especially useful for the treatment of textiles for obtaining crease-proofing or similar effects. Likewise the aqueous solutions of these ethers are valuable for the treatment of paper as for improving the wet strength thereof. After the treatment of these materials with the ether, it is usually desired to insolubilize the ethers by heating them at suitable temperatures, preferably in the presence of acid hardening catalysts.

The ethers are particularly well adapted for blending with alkyd resins, preferably in accordance with the procedure described in my copending application Serial No. 427,025 filed January 16, 1942. The ether alone or blended with the alkyd resin forms an exceedingly valuable coating material such as a lacquer or the like.

Suitable other changes and variations may be made in carrying out the invention without departing from the spirit and scope thereof as defined in the appended claims.

I claim:

1. The process which comprises preparing a mixture of dimethylol urea with an aliphatic alcohol selected from the group consisting of methyl and ethyl alcohols and an acid capable of forming an insoluble metal salt, the amount of acid being such as to make the mix more acid than pH 4, reacting the mixture at temperatures below 30° C. until a clear solution is obtained, adding a soluble metal compound of the nature and in an amount sufficient to remove the acid as an insoluble metal salt, removing the precipitated metal salt, concentrating the remaining solution in vacuo at a temperature not exceeding 50° C., and recovering the dialkyl ether of dimethylol urea from the solution by adding sufficient hydrocarbon selected from the group consisting of benzol and toluol to remove the remaining water on further distillation whereby the ether will precipitate from the residual hydrocarbon.

2. The process which comprises preparing a mixture of dimethylol urea with an aliphatic alcohol selected from the group consisting of methyl and ethyl alcohols and an acid capable of forming an insoluble metal salt, the amount of acid being such as to make the mix more acid than pH 4, reacting the mixture at temperatures below 30° C. until a clear solution is obtained, adding a soluble metal compound of the nature and in an amount sufficient to remove the acid as an insoluble metal salt, removing the precipitated metal salt, concentrating the remaining solution in vacuo at a temperature not exceeding 50° C., and recovering the dialkyl ether of dimethylol urea from the solution by adding sufficient toluol to remove remaining water on further distillation whereby the ether will precipitate from the residual toluol.

3. The process which comprises preparing a mixture of dimethylol urea with methyl alcohol and an acid capable of forming an insoluble metal salt, the amount of acid being such as to make the mix more acid than pH 4, reacting the mixture at temperatures below 30° C. until a clear solution is obtained, adding a soluble metal compound of the nature and in an amount sufficient to remove the acid as an insoluble metal salt, removing the precipitated metal salt, concentrating the remaining solution in vacuo at a temperature not exceeding 50° C., and recovering the dimethyl ether of dimethylol urea from the solution by adding sufficient toluol to remove remaining water on further distillation whereby the ether will precipitate from the residual toluol.

4. A process which comprises preparing a mixture of dimethylol urea with methyl alcohol and oxalic acid in an amount sufficient to make the mixture more acid than pH 4, reacting the mixture below 30° C. until a clear solution is obtained, adding sufficient barium hydroxide to the solution to give a pH of about 7.5, removing the precipitated barium oxalate, concentrating the remaining solution in vacuo at a temperature not exceeding 50° C. and recovering the dimethyl ether of dimethylol urea from the solution by adding sufficient toluol to remove the remaining water on further distillation whereby the ether will precipitate from the residual toluol.

HERBERT J. WEST.